United States Patent
Vanhall et al.

(10) Patent No.: US 10,095,946 B2
(45) Date of Patent: Oct. 9, 2018

(54) SYSTEMS AND METHODS FOR STRIKE THROUGH DETECTION

(71) Applicant: LOCKHEED MARTIN CORPORATION, Bethesda, MD (US)

(72) Inventors: Richard C. Vanhall, Owego, NY (US); Robert S. Lunt, IV, Endicott, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 42 days.

(21) Appl. No.: 15/204,419

(22) Filed: Jul. 7, 2016

(65) Prior Publication Data
US 2018/0012099 A1    Jan. 11, 2018

(51) Int. Cl.
| | |
|---|---|
| G06K 9/34 | (2006.01) |
| G06K 9/46 | (2006.01) |
| G06K 9/00 | (2006.01) |
| G06K 9/32 | (2006.01) |
| G06K 9/50 | (2006.01) |

(52) U.S. Cl.
CPC ......... *G06K 9/344* (2013.01); *G06K 9/00442* (2013.01); *G06K 9/3275* (2013.01); *G06K 9/4604* (2013.01); *G06K 9/50* (2013.01); *G06K 2209/01* (2013.01)

(58) Field of Classification Search
CPC ...... G06K 9/344; G06K 9/325; G06K 9/3258; G06K 9/3283; G06K 9/00456; G06K 2209/01; G06K 9/4604; G06K 17/21
See application file for complete search history.

(56) References Cited

U.S. PATENT DOCUMENTS

| | | | |
|---|---|---|---|
| 5,321,770 A | 6/1994 | Huttenlocher et al. | |
| 5,594,815 A | 1/1997 | Fast et al. | |
| 5,664,027 A * | 9/1997 | Ittner | G06K 9/3208 |
| | | | 382/170 |
| 5,745,600 A | 4/1998 | Chen et al. | |
| 6,111,993 A * | 8/2000 | Matsunaga | G06T 7/13 |
| | | | 382/103 |
| 6,539,112 B1 | 3/2003 | Smith | |
| 6,740,835 B2 | 5/2004 | Steinmetz et al. | |
| 7,016,536 B1 * | 3/2006 | Ling | G06T 5/006 |
| | | | 382/190 |

(Continued)

OTHER PUBLICATIONS

Australian Examination Report No. 1 dated Feb. 16, 2018 in related AU Application No. 2017204514, 4 pages.

(Continued)

*Primary Examiner* — Jingge Wu
(74) *Attorney, Agent, or Firm* — Kent E. Kemeny; Andrew M. Calderon; Roberts Mlotkowski Safran Cole & Calderon, P.C.

(57) ABSTRACT

The present disclosure is directed to systems and methods for strike through detection and, more particularly, to systems and methods for detecting a strike through in an address block of a mailpiece. The method is implemented in a computing device and includes: generating edges of lines within a text block identified through optical character recognition processes; locating text lines within the text block; characterizing the edges within the text lines and outside of the text lines; and grouping identified edges of the characterized edges outside of the text lines into co-linear groups.

20 Claims, 5 Drawing Sheets

(56) References Cited

U.S. PATENT DOCUMENTS

| | | | | |
|---|---|---|---|---|
| 8,135,217 | B2* | 3/2012 | Goktekin | G06K 9/3283 382/106 |
| 8,138,438 | B2 | 3/2012 | Stemmle | |
| 8,472,719 | B2 | 6/2013 | Tuganbaev et al. | |
| 2002/0106124 | A1* | 8/2002 | Wang | G06K 9/00449 382/173 |
| 2005/0018878 | A1* | 1/2005 | Paquette | G06K 9/4604 382/101 |
| 2006/0008114 | A1* | 1/2006 | Sekiguchi | G06K 9/00456 382/100 |
| 2009/0252415 | A1* | 10/2009 | Worm | G06K 9/3233 382/176 |
| 2010/0111356 | A1 | 5/2010 | Berger et al. | |
| 2013/0194448 | A1* | 8/2013 | Baheti | G06K 9/00456 348/222.1 |
| 2014/0140571 | A1 | 5/2014 | Elmenhurst et al. | |
| 2016/0092754 | A1* | 3/2016 | Kuznetsov | G06K 9/72 382/282 |

OTHER PUBLICATIONS

Brink et al, "Automatic removal of crossed-out handwritten text and the effect on writer verification and identification", University of Groningen, 2008, 11 pages.

Adams, "Algorithm for Text Document De-Skewing", Case Western Reserve University, Cleveland, Dec. 2004, 48 pp.

European Search Report dated Nov. 13, 2017 in related EP Application No. 17179993.5-1901, 10 pages.

Adak et al. "An Approach of Strike-through Text Identification from Handwritten Documents", 2014 14th International conference on Frontiers in Handwriting Recognition, IEEE, Sep. 1, 2014, 6 pages.

Bhattacharya et al., "Overwriting Repetition and Crossing-out Detection in Online Handwritten Text", 2015 3rd IAPR Asian Conference on Pattern Recognition, IEEE, Nov. 3, 2015, 5 pages.

Likforman-Sulem et al, "HMM-based Offline Recognition of Handwritten Words Crossed out with Different Kinds of Strokes", Proc. 11th International Conference in Handwriting Recognition, Jan. 1, 2008, 5 pages.

\* cited by examiner

SYSTEMS AND METHODS FOR STRIKE THROUGH DETECTION

FIELD OF THE INVENTION

The invention is directed to systems and methods for strike through detection and, more particularly, to systems and methods for detecting a strike through in an address block of a mailpiece.

BACKGROUND DESCRIPTION

Mailpiece address blocks that have been struck through need to have that fact identified so that processing can take the strike through into account. Traditional connected region analysis approaches have difficulties in assessing the strike through of the address blocks due to connectedness variability and shape variability.

By way of explanation, an address block with strike through has two major effects on mailpiece processing. First, depending on higher contexts, it almost certainly means that the given block should not be used as the destination for the mailpiece. Second, any information gleaned from the address block may be suspect as having a strike through often confuses the optical character recognition (OCR) process because of the way it "connects" characters from multiple lines. Either of these effects are sufficient to want to determine that a strike through is present.

As one example, the processes that are used to find address blocks use connected region analysis. In connected region analysis, sets of touching black pixels are grouped together into characters. A strike through, though, confuses the connected region analysis and damages the character isolation process. To compensate for this deficiency, a pixel based examination of the suspect groups is needed to detect the strike through in the address block, which is not an efficient use of processing.

SUMMARY OF THE INVENTION

In an aspect of the invention, a method implemented in a computing device, comprises: generating edges of lines within a text block identified through optical character recognition processes; locating text lines within the text block; characterizing the edges within the text lines and outside of the text lines; and grouping identified edges of the characterized edges outside of the text lines into co-linear groups.

In yet another aspect of the invention, a computer program product for identifying a strike through in an address block comprises program code embodied in a computer-readable storage medium. The program code is readable/executable by a computing device to: obtain an address block with accompanying information using optical character recognition processes; detect edges of all marks within the address block; locate text lines within the address block; adjust the text lines both vertically and horizontally; and characterize the edges and group the characterized edges together that are identified as a strike through and exclude the edges that are above a certain threshold as text.

In still yet another aspect of the invention, a system comprises a CPU, a computer readable memory and a computer readable storage medium. The system further comprises program instructions to: to obtain an address block with accompanying information using optical character recognition processes; to detect edges of all marks within the address block; to adjust text lines both vertically and horizontally; to characterize the edges; and to group the characterized edges together that are identified as a strike through. The program instructions are stored on the computer readable storage medium.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for strike through detection and, more particularly, to systems and methods for detecting a strike through in an address block of a mailpiece. In embodiments, the systems and methods can detect a strike through in an address block by using edges of strokes (or objects) associated with marks (e.g., lines) within the address block. Advantageously, in the methods provided herein the domain (e.g., edges) stays fairly constant as connectedness and gross shape varies resulting in a more accurate identification of the strike through with the added benefit that such identification can be faster compared to the conventional connected region analysis approaches.

In embodiments, the solution to the poor applicability of conventional connection region analysis approaches to detect a strike though is to use a different domain, i.e., edges of print within the address block. For example, edges extracted from the address block can be redrawn as lines, which can then be separated from the address block text. In this way, it is easy to discern and distinguish the strike through from the text in the address block. In embodiments, the edges can be generated quickly from bilevel imaging without the need for further image access or processing. Also, the edge domain remains relatively constant in face of heavy connected text and light broken text, i.e., the edge is invariant to connectivity.

As should be understood by those of skill in the art and as further described herein, edges are groups of white to black (or black to white) transitions that are spatially related. For example, a dash "-" would have two edges, the top white to black and the bottom black to white; whereas, an "O" can have approximately eight (8) edges (with some curve) representing the outside and inside top, bottom, left, and right. Advantageously, the edges stay fairly constant as connectedness changes. For instance, a line of five (5) characters that are all connected would have one region versus five if they were unconnected. Edges will also disconnect the strike through lines from characters that they may touch.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-readable program code embodied in computer-readable storage medium (non-transitory medium). The computer-readable storage medium can contain or store information for use by or in connection with the instruction execution system, apparatus, or device. The computer-readable storage medium may be, for example, an electronic, magnetic, optical, electromagnetic, infrared, or semiconductor system, apparatus, or device or other non-transitory medium, memory, device or system.

More specific examples of the computer-readable storage medium would include the following non-transitory systems, devices and/or memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium, memory, system and/or device is not to be construed as being transitory signals per se. Hereinafter, the computer readable storage medium, memory, system and/or device is generally referred to as computer readable storage medium.

Figure 1:
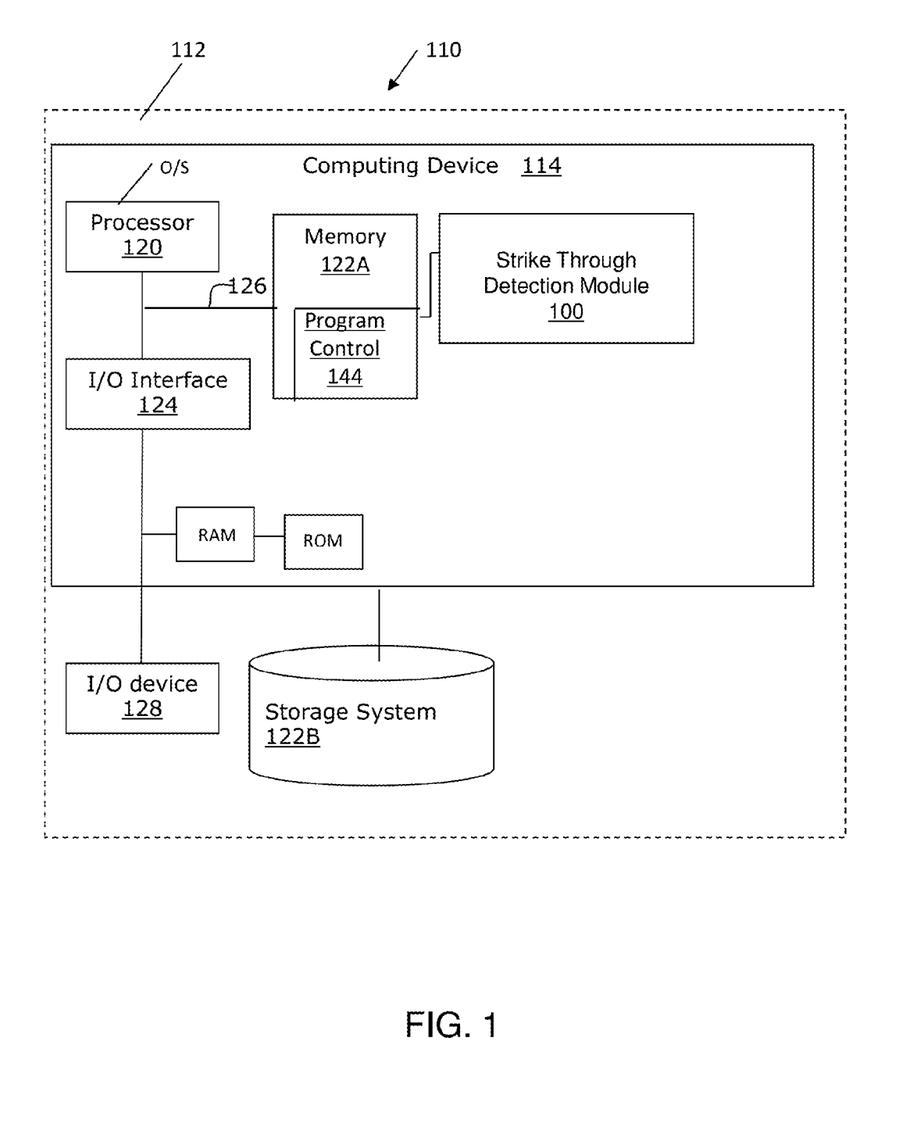
FIG. 1 shows an illustrative environment for implementing the steps in accordance with aspects of the invention.

FIG. 1 shows an illustrative environment 110 for managing the processes in accordance with the invention. The environment 110 includes a server or other computing system 112 that can perform the processes described herein. In embodiments, the illustrative environment may be used in a mail sorting and sequencing system as shown illustratively in FIG. 3; although other sorting and sequencing systems are also contemplated by the present invention. The computing system 112 includes a computing device 114 which can be resident on or communicate with a network infrastructure or other computing devices.

The computing device 114 includes a processor 120, memory 122A, an I/O interface 124, and a bus 126. In addition, the computing device 114 includes random access memory (RAM), a read-only memory (ROM), and an operating system (O/S). The computing device 114 is in communication with an external I/O device/resource 128 and the storage system 122B. The I/O device 128 can comprise any device that enables an individual to interact with the computing device 114 (e.g., user interface) or any device that enables the computing device 114 to communicate with one or more other computing devices using any type of communications link or any device that enables the computing device 114 to interact with its environment. By way of example, the I/O device 128 can be a barcode scanning device or optical character recognition device, for reading/detecting address blocks having text and at least one strike through.

The processor 120 executes computer program code (e.g., program control 144), which can be stored in the memory 122A and/or storage system 122B. While executing the computer program code, the processor 120 can read and/or write data to/from memory 122A, storage system 122B, and/or I/O interface 124. The program code 144 executes the processes of the invention such as, for example, detecting a strike through in an address block of a mailpiece. As discussed in more detail below, by making such determination it is now possible to determine whether a mailpiece should be sent to the address within the address back or returned to the sender, based on whether a strike through is present through the address. This will ensure proper and efficient delivery of the mailpiece and reduce any confusion on the part of the optical character recognition system (OCR).

The computing device 114 includes a strike through detection module 100, which can be implemented as one or more program code in the program control 144 stored in memory 122A as a separate or combined module. Additionally, the strike through detection module 100 may be implemented as separate dedicated processors or a single or several processors to provide the functionality of this tool. Moreover, it should be understood by those of ordinary skill in the art that the strike through detection module 100 is used as a general descriptive term for providing the features and/or functions of the present invention, and that the strike through detection module 100 may comprise many different components such as, for example, the components and/or infrastructure described and shown with reference to FIG. 1.

In embodiments, the strike through detection module 100 is operative and/or configured to detect a strike through in an address block or text of a mailpiece or other object. This is generally accomplished by providing the following functionality: (i) obtain externally supplied information for locating the address block that will be examined for a strike through and, optionally locating the text lines within the address block; (ii) generate edges of the text and any marks within the address block; (iii) locate the text lines within the address block and adjust the text lines both vertically and horizontally; (iv) characterize the edges (of the text, strike through or other marks); (v) group the remaining edges into co-linear groups (those edges that are not identified as text); (vi) score the groups (optional) and exclude the edges that are above a certain threshold (e.g., edges inside of the text lines that are characterized as text); and (vii) optionally, generate a report.

Implementations

FIGS. 2A-2F show several illustrative schematics representative of processing sequences in accordance with aspects of the invention. The processing sequences shown in FIGS. 2A-2F can be implemented in the computing system shown in FIG. 1 and implemented within the illustrative mail sorting and sequencing system of FIG. 3. In embodiments, the several processing sequences in FIGS. 2A-2F can be representative of an exemplary process flow implemented in a system, a method, and/or a computer program product and related functionality implemented in the computing system of FIG. 1. Accordingly, the processes associated with each processing sequence can be implemented by special purpose hardware-based systems that perform the specified functions or acts or carry out combinations of special purpose hardware and computer instructions.

Figure 2A:
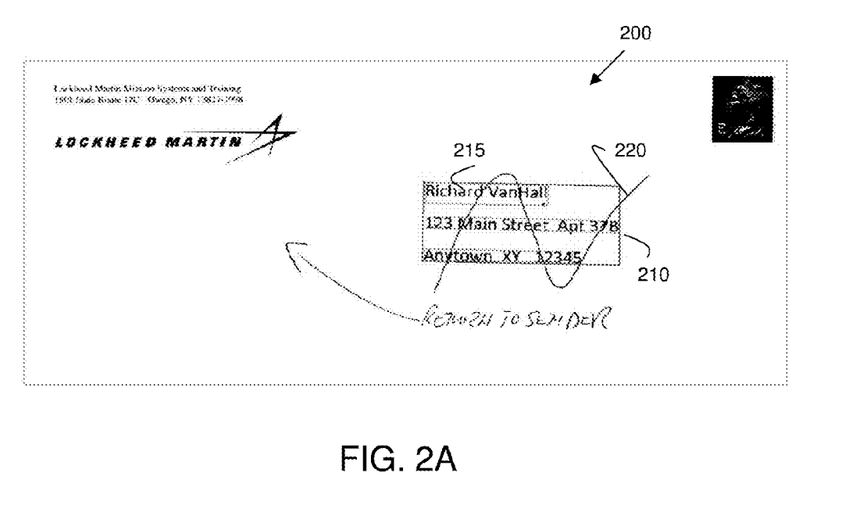
FIGS. 2A-2F show several illustrative schematics representative of processing sequences in accordance with aspects of the invention.

More specifically, FIG. 2A shows a mailpiece 200 with an address block 210. The address block 210 includes information such as text lines 215 and at least one strike through 220 passing through one or more of the text lines 215 of the address block 210. The address block 210 can be detected and/or delineated by any conventional optical character recognition processes including, e.g., connected region analysis, and provided to the systems and methods of the present invention. In optional or alternative embodiments, the conventional optical character recognition processes can also detect the location of the text lines 215. In additional optional embodiments, the systems and methods described herein can also be configured to operatively detect the address block 210, text lines 215 and the strike through 220.

Figure 2B:
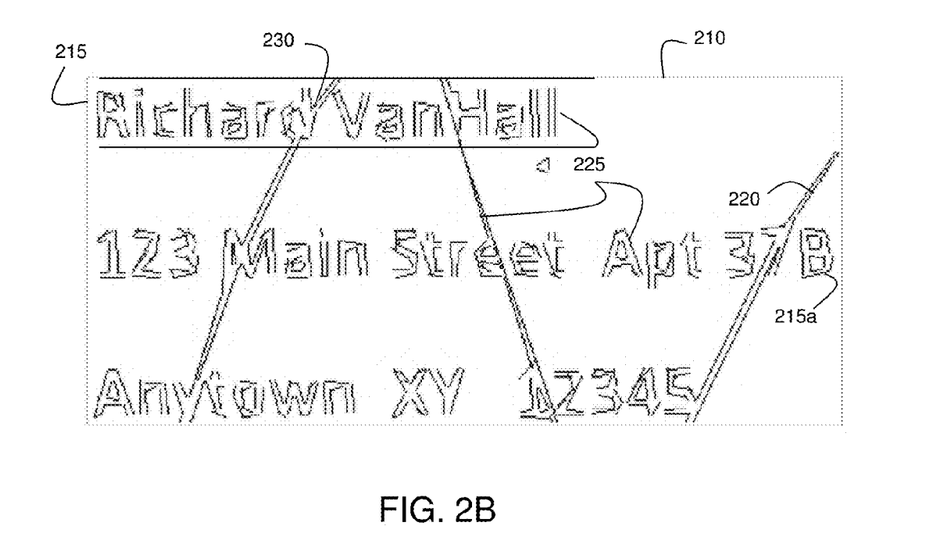

As shown in FIG. 2B, the processing sequence (implementing the systems and methods described herein) will detect edges 225 of all marks (e.g., text 215*a* within the text lines 215 and strike through 220) in accordance with aspects of the invention. In embodiments, the edges 225 are groups of white to black (or black to white) transitions that are spatially related. As noted already, the edges 225 stay fairly constant as connectedness changes. Also, edges will generally disconnect the strike through lines 220 from characters (e.g., text 215*a*) that they may touch as shown representatively at reference numeral 230.

Figure 2C:
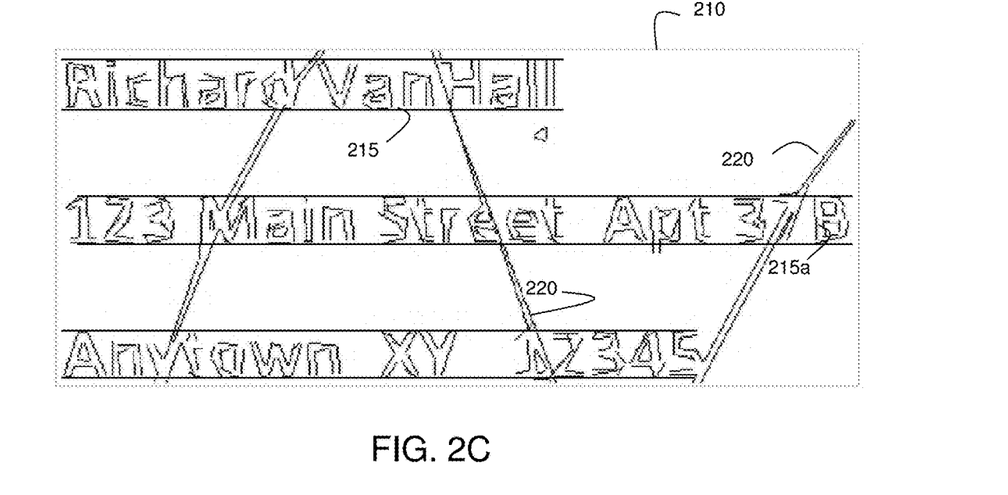

In FIG. 2C, the processing sequence (implementing the systems and methods described herein) will locate or detect text lines 215 in accordance with aspects of the invention. The processing sequence (implementing the systems and methods described herein) will then adjust the text lines 215 both vertically and horizontally. In embodiments, the adjustment of the text lines 215 can be accomplished by using any conventional deskewing processes, e.g., see U.S. Pat. No. 5,594,815.

By way of another example of deskewing processes, all lines in the image can be calculated with the Hough Transformation. As should be understood by those of skill in the art, the Hough Transform provides a good estimate of line angles in an image, which can be extended to lines of text. For example, the lines are represented as all (x, y) that satisfy $y*\cos(alpha)-x*\sin(alpha)=d$. For each pair (alpha,d) in the search space the count of points that are on the line are calculated, with interest only in the lower bounding line of the text. It is noted that otherwise extraneous lines that have nothing to do with the skew angle will be captured. For that reason only points are considered that have a white point below. The skew angle can then be determined as the average angle. To speed up the calculation sin(alpha) and cos(alpha) are precalculated for the search range and saved in an array. It should be understood by those of skill in the art that other skew or identification methods known to those in the art can also be implemented with the systems and methods described herein.

Figure 2D:
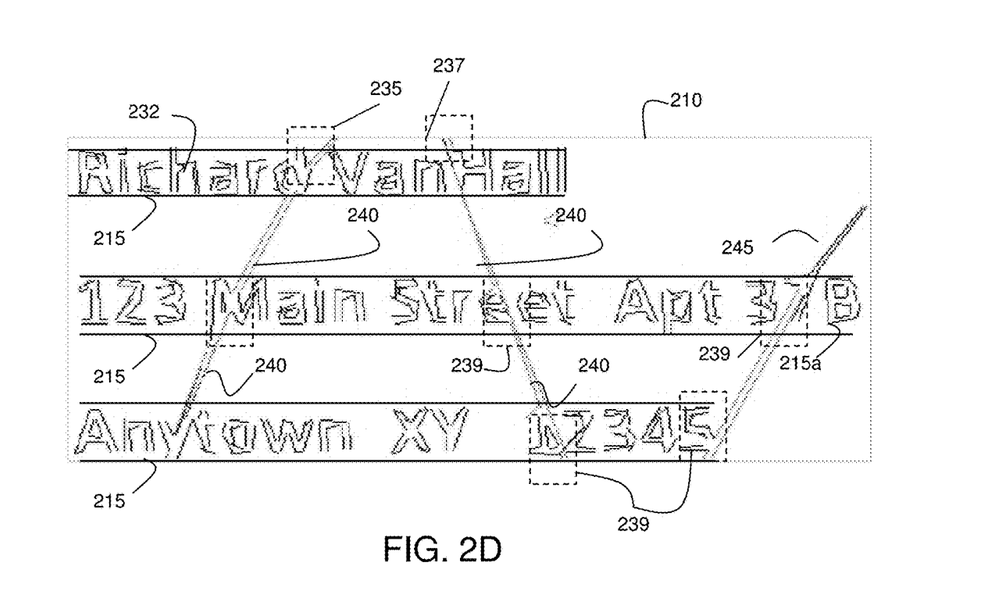

In FIG. 2D, the processing sequence (implementing the systems and methods described herein) will characterize edges 232 within the text lines 215 in accordance with aspects of the invention. These edges 232 can be characterized as text 215*a* of the address block 210, for example. In embodiments, additional edges within the text lines 215, as represented by boxes 235, may be characterized as a possible strike through due to their proximity and, for example, extraneous lines extending from, the actual text 215*a*. In addition, edges 240 between the text lines 215 and any edges 245 outside of the text line 215 (e.g., which do not have a text line 215 above or below, or which are provided on a side of the text line 215) may be identified (characterized) as a strike through possibility by the systems and processes described herein. It should be understood, though, that some edges 237 extending from the text 215 (extending to outside the text lines 215) may be characterized as text 215*a*, as the edges 237 are extensions of the text characters (without any breaks). Similarly, some edges as shown within boxes 239 that are within the text line 215 may be characterized as a strike through, as they are clearly extending from the edges 240, 245 (without any breaks). Any marks outside of the address block 210 are not analyzed.

In embodiments, the edges 239, 240, 245, 245*a* identified or characterized as a possible strike through can then be positively identified by grouping them together. On other words, the edges that are within the text line and identified or closely identified as text can be excluded, resulting in locating of the strike through. More specifically, in FIG. 2E, the processing sequence (implementing the systems and methods described herein) will group the edges 240, 245, 245*a* outside of the text lines 215 into co-linear groups (e.g., transition between white to black and black to white) as represented by areas labeled with reference numerals 250, 250*a*. In addition, the edges 239 within the text line 215 and which appear extraneous to the text, itself, and which appear to extend from edges 240 in a substantially same direction, for example, can also be characterized in the groups, 250, 250*a*. Any edges such as, e.g., edges 235, 237, which are in the text line 215 may be excluded from the group; although, in optional embodiments, the edges 235 may also be included in these groups 250 depending on a weight or score provided to the edges. For example, if edge 235 is mainly within the text line, it may be excluded from the group.

Figure 2E:
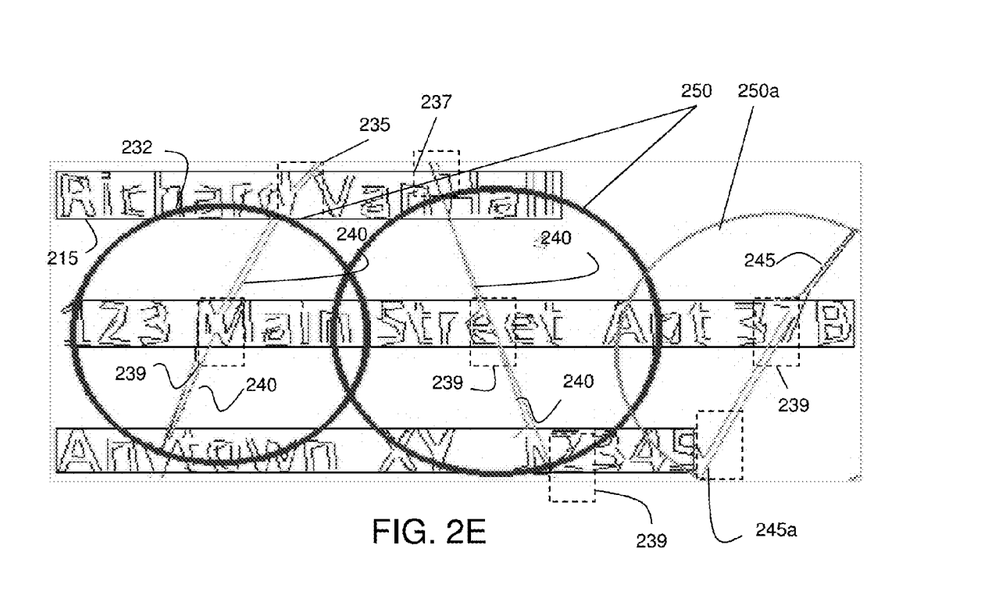

In additional embodiments, any of the edges or groups can be weighted or scored and any edges or groups that are above a certain threshold, e.g., above a 90% confidence level, etc., can be identified and excluded. For example, a higher weight or score can be provided to the edges 237 than to that of the edges 240 provided between the text lines 215 the such that edges 237 meet a certain threshold and, hence, can be excluded (as not being a strike through). Similarly, a higher weight or score can be provided to the edges 237 than that of the edges 239 provided within the text lines 215 and extending from the edges 240 such that the edges would be excluded. This same process can occur with a comparison of edges 239 and 240, for example. Similarly, the groups can also be weighted or scored differently. For example, the group 250*a* can have a higher weight or score than that of the group 250. This may be due to the fact that group 250 includes edges that are between text lines 215; whereas, group 250*a* includes edges that are on a side of the text line, with no text line above or below the edges.

Figure 2F:
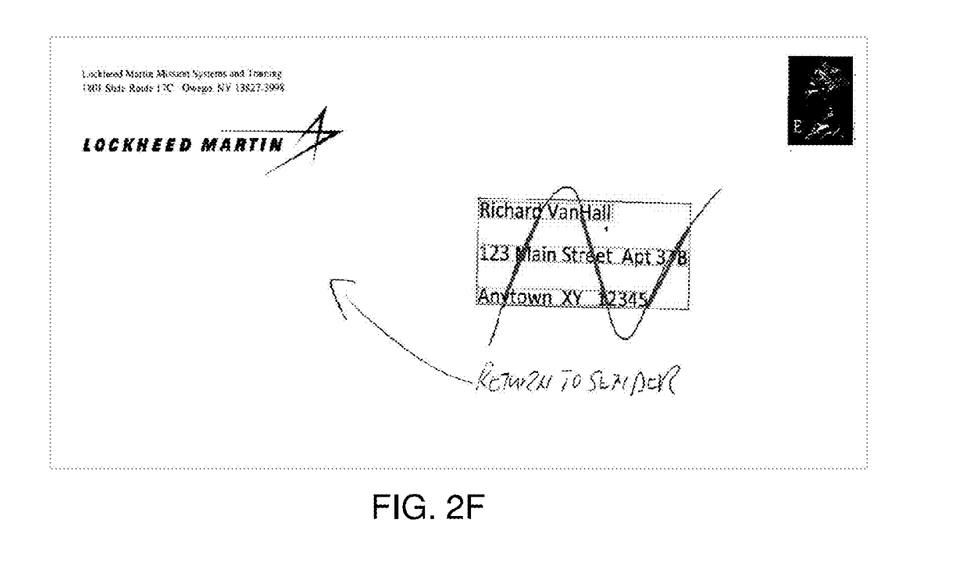

In FIG. 2F, the processing sequence (implementing the systems and methods described herein) will generate a report in accordance with aspects of the invention. In embodiments, the report can include a highlighted portion 260 which is representative of a strike through. In this representative embodiment, the highlighted portion 260 is provided within the address block 210 and includes portions passing through the text lines 215. It should be understood by those of skill in the art that other reports can also be generated, depending on the score of the edges or groups, for example.

Figure 3:
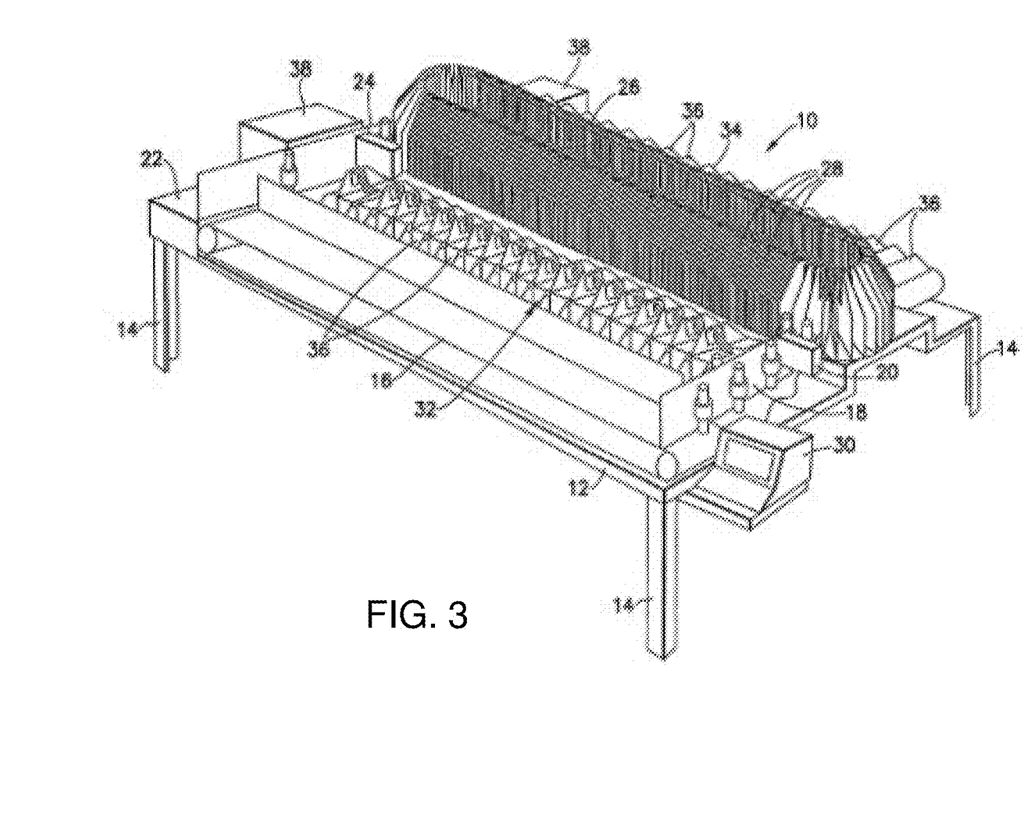
FIG. 3 shows an illustrative mail sorting and sequencing system, which can be used in implementing the processes of the present invention.

FIG. 3 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 3 should not be considered a limiting feature to the claimed invention.

As shown in FIG. 3, the mail sorting and sequencing system is a single pass carrier delivery sequence sorter generally indicated by the numeral 10. The single pass carrier delivery sequence sorter 10 has a base 12 with four legs 14 (only three shown in FIG. 3) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising:
    generating edges of lines within a text block identified through optical character recognition processes;
    locating text lines within the text block;
    identifying each of the edges outside of the text lines as strike through;
    grouping the identified edges outside of the text lines into co-linear groups comprising at least the strike through; and
    identifying, as the strike through, edges within the text lines that extend from the identified edges outside of the text lines.

2. The method of claim 1, further comprising excluding any edges or groups above a certain threshold from being identified as the strike through, and identifying the edges or groups above the certain threshold as text.

3. The method of claim 1, further comprising adjusting the text lines both vertically and horizontally prior to the identifying.

4. The method of claim 3, further comprising grouping the identified edges within the text lines with the edges in the co-linear groups comprising at least the strike through.

5. The method of claim 4, wherein the lines within the text lines that do not extend from the identified edges outside of the text lines are identified as text.

6. The method of claim 1, wherein the edges within the text lines that do not extend from the identified edges outside of the text lines are identified as text.

7. The method of claim 1, further comprising generating a report of an identified strike through in the text block.

8. The method of claim 1, wherein the text block is an address block of a mailpiece.

9. The method of claim 1, wherein the edges are white to black or black to white transitions that are spatially related.

10. A computer program product for identifying a strike through in an address block, the computer program product comprising program code embodied in a computer-readable storage medium, the program code is readable/executable by a computing device to:
    obtain an address block with accompanying information using optical character recognition processes;
    detect edges of all marks within the address block;
    locate text lines within the address block;
    adjust the text lines both vertically and horizontally;
    identify each of the edges outside of the text lines as the strike through; and
    group together the identified strike through and additional edges within the text lines which extend from the identified strike through in a substantially same direction, and exclude edges that are above a certain threshold as text within the text lines.

11. The computer program product of claim 10, wherein the detecting the edges of all marks including detecting transition between white to black or black to white that are spatially related.

12. The computer program product of claim 11, wherein the edges will disconnect the strike through from the text.

13. The computer program product of claim 11, wherein the identifying the edges includes identifying edges within the text lines and outside of the text lines.

14. The computer program product of claim 13, wherein the edges within the text lines are mainly excluded.

15. The computer program product of claim 10, wherein the edges are invariant to connectivity such that edge domains remain relatively constant in connected text and lightly broken text.

16. The computer program product of claim 10, wherein the groups are co-linear groups representing a strike through.

17. The computer program product of claim 16, wherein the co-linear groups span at least one text line and between the text lines.

18. A system comprising:
    a hardware processor, a computer readable memory and a computer readable storage medium associated with a computing device;
    program instructions to obtain an address block with accompanying information using optical character recognition processes;
    program instructions to detect edges of all marks within the address block;
    program instructions to adjust text lines both vertically and horizontally;
    program instructions to identify each of the edges outside of the text lines as strike through; and
    program instructions to group together the edges that are identified as the strike through,
    wherein the program instructions are stored on the computer readable storage medium for execution by the hardware processor via the computer readable memory.

19. The system of claim 18, wherein:
    the detecting the edges includes detecting a transition between white to black or black to white that are spatially related;
    the identifying the edges includes identifying edges within the text lines and outside of the text lines;

the groups are co-linear groups representing a strike through spanning at least one text line and between the text lines.

20. The system of claim 18, wherein the edges are invariant to connectivity such that edge domains remain relatively constant in connected text and lightly broken text.

* * * * *